United States Patent Office 2,963,766
Patented Dec. 13, 1960

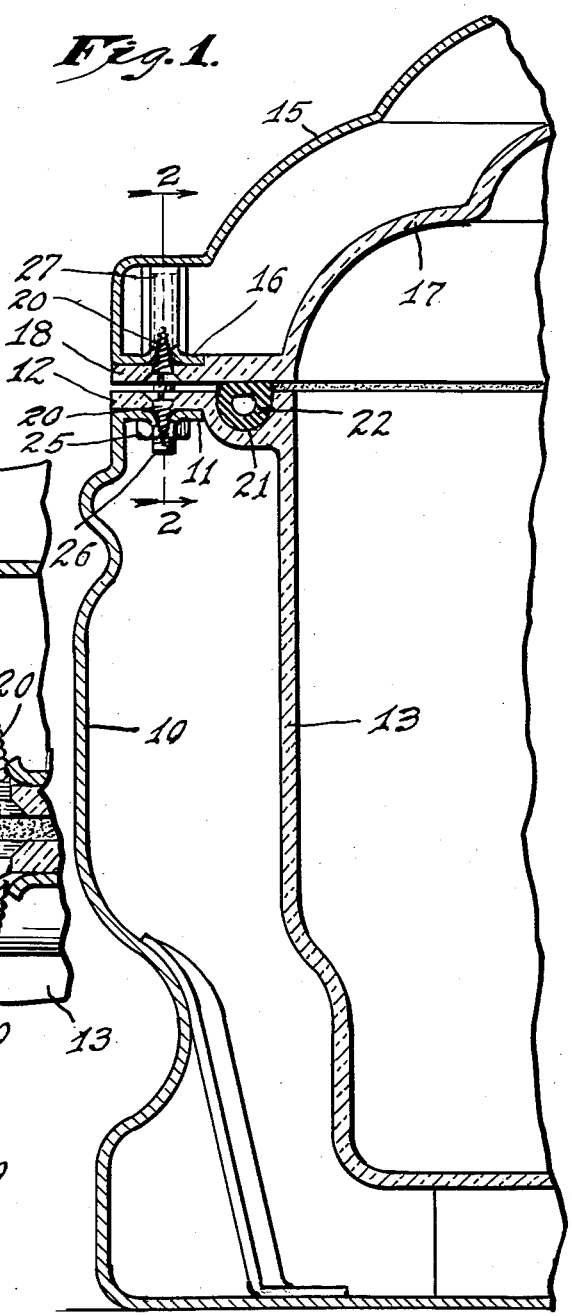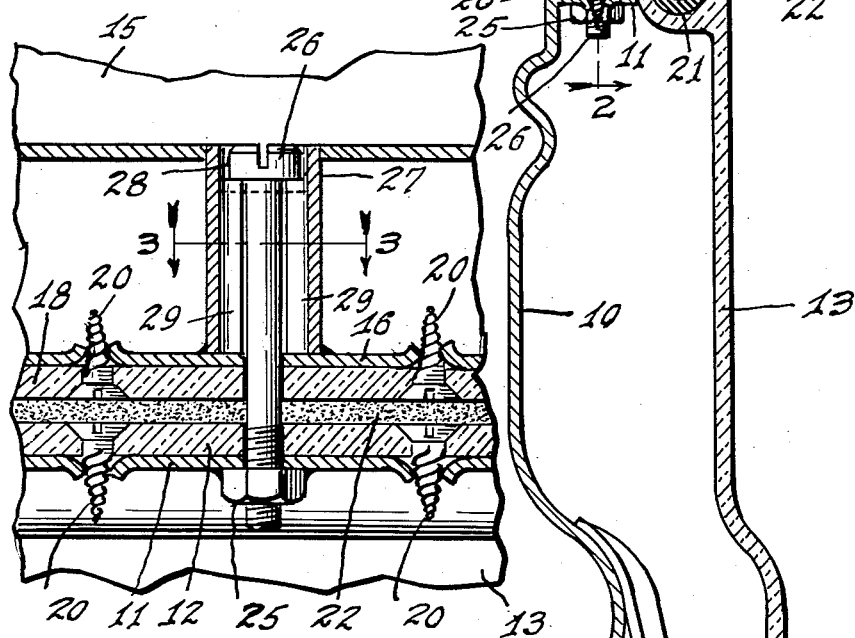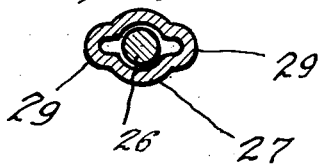
Dec. 13, 1960   W. E. WALLACE   2,963,766
CASKET
Filed Nov. 7, 1957
Fig.1.
Fig.2.
Fig.3.
INVENTOR.
WALTER E WALLACE,
BY
ATTORNEYS.

2,963,766

CASKET

Walter E. Wallace, Richmond, Ind., assignor to Wallace Metal Products, Inc., Richmond, Ind., a corporation of Indiana Filed Nov. 7, 1957, Ser. No. 695,095

7 Claims. (Cl. 27—17)

This invention relates to a burial casket and has for its principal object the production of a casket of improved construction and sealing capabilities.

A preferred form of casket embodying the invention comprises a casket-body and a removable, full-length cover therefor. Both the body and the cover have liners of rigid, impervious material formed to provide continuous, opposed peripheral flanges between which a sealing gasket is received. Preferably, although not necessarily, the liners are molded to shape in known manner from a resin-bound glass-fiber mat. Clamping means, conveniently in the form of a series of bolts, acts between the opposed liner-flanges to hold the cover in place and compress the gasket.

In the accompanying drawing which illustrates a preferred embodiment of the invention:

Fig. 1 is a fragmental cross-section of a casket;

Fig. 2 is a fragmental vertical section on the line 2—2 of Fig. 1; and

Fig. 3 is a horizontal section on the line 3—3 of Fig. 2.

The casket shown in the drawing comprises a body or shell 10 formed of sheet-metal. The upper edges of the shell 10 are turned inwardly to provide flanges 11 upon which rests an outwardly projecting peripheral flange 12 of a liner 13. As previously indicated, such liner is desirably molded from resin-bound, glass-fiber mat. The cover 15 for the casket, like the body 10, is formed of sheet-metal, and the edges of the cover are turned inwardly to provide a flange 16 which desirably extends for the entire periphery of the cover. A cover liner 17, conveniently formed of the same material as the body liner 13, has a peripheral flange 18 which lies below the flange 16 of the cover. The flanges 12 and 18 of the two liners may be secured in position in the shell 10 and cover 15 by screws 20 which pass through the liner-flange 12 or 18 into the associated sheet-metal flange 11 or 16.

Desirably, the walls of the body-liner 13 are spaced inwardly from the walls of the shell 10 so that the only contact between the liner and shell is at the interengaging flanges 11 and 12. The liner 13 is effectively rigid and strong enough to permit it to be supported only at its periphery. To that end, the liner may have a thickness of about one-eighth to three-sixteenths of an inch, although its peripheral flange 12 may be somewhat thicker. The cover liner 17 is similar and is also spaced from the cover 15 except at the peripheral flanges.

To seal the casket, at least one of the flanges 12 and 18, shown as the flange 12, is provided adjacent its inner edge with a continuous, generally semi-circular groove 21 adapted to receive a sealing element desirably in the form of a length of tubing 22 of rubber or similar resilient material. The sealing element projects above the upper surface of the flange 12 for engagement with the flange 18 of the cover-liner.

To secure the cover in place on the body of the casket, I employ a series of bolts spaced around the periphery of the casket. Conveniently, each of such bolts includes a nut 25 welded in proper position against the lower surface of the flange 11 on the casket-body 10 and a screw 26 which projects upwardly through the marginal portion of the cover. As shown, each screw is surrounded by a tubular sleeve 27 formed to provide at its upper end a counterbore or recess 28 which receives the head of the screw 26. Conveniently, each sleeve 27 is formed from a length of metal tubing having a diameter such that it can receive the head of the screw 26, and the lower portion of the tubing is reduced in diameter to provide the counterbore bottom against which the head of the screw 26 seats. Such reduction in the diameter of the tubing may be effected by partially collapsing it in such a way as to form ribs 29 extending longitudinally of the sleeve. The lower end of each sleeve 27 may be tack-welded to the flange 16 to hold the sleeve in place. The upper end of the sleeve extends into a hole in the cover 15 and is trimmed to be substantially flush with such cover.

When the cover is to be locked in place, the screws 26 are passed through the sleeves 27 and into the nuts 25. When the screws are tightened, their heads seat on the bottoms of the recesses 28, and the clamping effort exerted by each is transmitted through the sleeve 27 and applied directly to the flange 16 to compress the gasket 22.

I claim as my invention:

1. In a burial casket, a body shell, a removable cover shell therefor, a rigid liner for each of said shells, each of said shells having an in-turned peripheral flange, said body shell liner having an outwardly projecting peripheral flange resting on the flange of the body shell, said cover shell liner having a marginal flange secured to the lower face of the cover shell flange to lie in opposed relation to the flange of the body shell liner, said liners being spaced from said shells except for the engagement of their flanges with those of the shells, a gasket disposed between the flanges of the two liners, and clamping means for compressing said gasket and securing the cover shell in place on the body shell.

2. A casket as set forth in claim 1 with the addition that said clamping means acts through the shell flanges on the liner flanges.

3. A casket as set forth in claim 1 with the addition that said clamping means includes a series of bolts extending through and acting between said flanges, each of said bolts including a nut disposed below the flange of the body shell and a screw extending upwardly through said flanges, said cover being provided with holes for access to said screws.

4. A casket as set forth in claim 3 with the addition of a spacer surrounding each screw, engaging the flange of the cover shell, and extending upwardly therefrom to be engaged by the head of the screw.

5. A casket as set forth in claim 1 with the addition that said clamping means includes a series of bolts extending through and acting between said flanges.

6. A casket as set forth in claim 1 with the addition that said liners are formed of resin-bound glass-fiber mat.

7. In a burial casket, a body shell, a removable cover shell therefor, a rigid liner for each of said shells, each of said shells having an inturned peripheral flange, said body shell liner having an outwardly projecting peripheral flange resting on the flange of the body shell, said cover shell liner having a marginal flange secured to the lower face of the cover shell flange to lie in opposed relation to the flange of the body liner, said liners being spaced from said shells except for the engagement of their flanges with those of the shells, said liner flanges having portions in overlapping relation beyond the inner edges of the shell flanges, a gasket disposed between the two-liner flanges and located inwardly from the inner edges of the shell flanges, and clamping means for compressing said gasket and securing the cover shell in place on the body shell.

References Cited in the file of this patent

UNITED STATES PATENTS

| | | |
|---|---|---|
| 194,530 | Nirdlinger | Aug. 28, 1877 |
| 1,149,907 | Gompf | Aug. 10, 1915 |
| 1,521,148 | Dennett et al. | Dec. 30, 1924 |
| 1,705,410 | Laidlaw | Mar. 12, 1929 |
| 2,096,290 | Strom | Oct. 19, 1937 |
| 2,247,617 | Metz | July 1, 1941 |
| 2,835,955 | Snyder | May 27, 1958 |

OTHER REFERENCES

"Plastics," The Embalmers Monthly, March 1945 (pages 24 and 26 relied on).